United States Patent [19]
Nagata et al.

[11] Patent Number: 4,548,980
[45] Date of Patent: Oct. 22, 1985

[54] TIRE TREAD RUBBER COMPOSITION

[75] Inventors: Takayoshi Nagata, Hyogo; Mitsuaki Hashiyama, Shiga, both of Japan

[73] Assignee: Toyo Tire & Rubber Co., Ltd., Osaka, Japan

[21] Appl. No.: 632,830

[22] Filed: Jul. 20, 1984

[30] Foreign Application Priority Data

Jul. 22, 1983 [JP] Japan ................. 58-134656

[51] Int. Cl.$^4$ .......................... C08K 3/04; C08L 7/00; C08L 9/00; C08L 9/06
[52] U.S. Cl. ................................. 524/495; 524/496
[58] Field of Search ................. 524/495, 496

[56] References Cited

U.S. PATENT DOCUMENTS

| | | | |
|---|---|---|---|
| 3,725,103 | 4/1973 | Jordan et al. | 524/495 |
| 4,035,336 | 7/1977 | Jordan et al. | 524/495 |
| 4,071,496 | 1/1978 | Kraus et al. | 524/495 |
| 4,309,318 | 1/1982 | Ahagon et al. | 524/495 |

FOREIGN PATENT DOCUMENTS 57-94030  6/1982  Japan ..................... 524/495

Primary Examiner—Allan M. Lieberman
Attorney, Agent, or Firm—Oblon, Fisher, Spivak, McClelland & Maier

[57] ABSTRACT

A rubber composition, comprising from 20 to 150 parts by weight of carbon black incorporated in 100 parts by weight of rubber, said carbon black being a furnace carbon black having (1) a specific surface area ($N_2SA$) within the range of 75 to 105 as measured by the nitrogen adsorption technique, (2) the difference between said $N_2SA$ value and the measured iodine adsorption (IA) being at least 15 ($N_2SA-IA \geq 15$) and (3) the difference between said $N_2SA$ value and the measured surface by the cetyltrimethylammonium bromide technique (CTAB) being not greater than 5 ($N_2SA-CTAB \leq 5$), said furnace carbon black further having a dibutyl phthalate adsorption value (24M4 DBP) of not greater than 110 (ml/100 g) and a tinting strength (Tint) of 90 to 110, said carbon black having a storage elastic modulus E' of not greater than 12.5 MPa as specified by the ASTM-D 3191 method for carbon blacks.

6 Claims, 2 Drawing Figures

TIRE TREAD RUBBER COMPOSITION

BACKGROUND OF THE INVENTION

1. Field of the Invention

The present invention relates to a rubber composition having a specific furnace carbon black incorporated therein. More particularly, the invention relates to a tire tread rubber composition capable of providing a tire tread having small energy loss and a great coefficient ($\mu$w) of sliding friction on a wet road surface.

2. Description of the Prior Art

With the current worldwide concern for saving resources and energy, car manufacturers are making intensive efforts to manufacture automobiles which achieve better mileage economy. To meet this end, studies have been conducted by tire manufacturers to find effective ways to minimize energy loss through tires.

Two principal functions of tires are to support the weight of the automobile and to transmit the driving force of the wheels. As is well known, the energy loss resulting from the friction between a tire and the road surface or from the heat generated by the tire itself has an appreciable effect on the fuel consumption of the car. However, the energy loss which results from the tire itself, i.e., its rolling resistance, cannot be reduced without also decreasing the coefficient ($\mu$w) of its sliding friction against a wet road surface. In other words, a tire with a small rolling resistance has a great tendency to skid.

In order to attempt to resolve these contradictory factors, studies have been conducted which involve the incorporation of carbon black in large quantities into rubber to prepare a tire tread rubber composition which has a small rolling resistance while exhibiting a high coeffficient ($\mu$w) of sliding friction on a wet road surface.

It is generally known that the rolling resistance (RR) of a tire is a function of $E''/E' = \tan\delta$, wherein $E''$ is the loss elastic modulus and $E'$ is the storage elastic modulus. Tires having a low loss tangent ($\tan\delta$) also have a low rolling resistance (RR). The coefficient ($\mu$w) of sliding friction on a wet road surface is also closely related to the viscoelasticity property of rubber and, the higher the $\tan\delta$, the higher the $\mu$w. However, a rubber composition having a high $\tan\delta$ has an undesirably high rolling resistance (RR).

SUMMARY OF THE INVENTION

Accordingly, one object of the present invention is to provide a tire tread rubber composition of reduced energy loss properties.

Another object of the present invention is to provide an improved tire tread composition which, in addition to exhibiting a reduced energy loss, also exhibits a substantially large coefficient of sliding friction ($\mu$w) on a wet road surface.

Briefly, these objects and other objects of the present invention as hereinafter will become more readily apparent can be attained by a rubber composition comprising from 20 to 150 parts by weight of carbon black incorporated in 100 parts by weight of rubber, said carbon black being a furnace carbon black having (1) a specific surface area (N$_2$SA) within the range of 75 to 105 as measured by the nitrogen adsorption technique, (2) the difference between said N$_2$SA value and the measured iodine adsorption (IA) being at least 15 (i.e., N$_2$SA−IA≧15), and (3) the difference between said N$_2$SA value and the measured specific surface area (CTAB) as determined by the cetyltrimethylammonium bromide adsorption technique being not greater than 5 (i.e., N$_2$SA−CTAB≦5), said furnace carbon black further having a dibutyl phthalate adsorption value (24M4 DBP) of not greater than 110 (ml/100 g) and a tinting strength (Tint) of 90 to 110, said carbon black having a storage elastic modulus E' of not greater than 12.5 MPa as specified by the ASTM-D 3191 method for carbon blacks.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
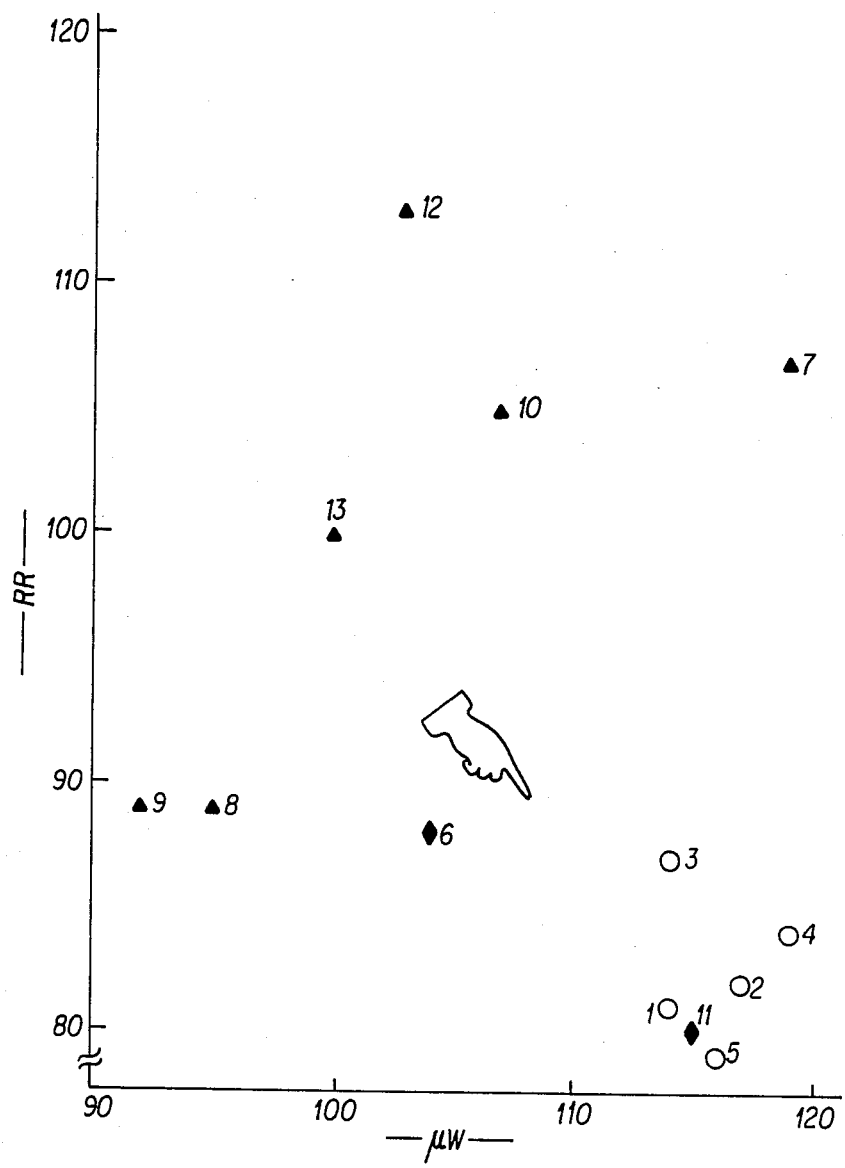
FIGS. 1 and 2 are graphs which show the relationship between the rolling resistance (RR) of tires and the sliding friction coefficient ($\mu$w) of tires on a wet road surface using treads made from the rubber formulations identified in Tables 1 and 2.

A rubber composition using a furnace carbon black whose specific surface area abbreviated as (N$_2$SA), as determined by the nitrogen adsorption technique is less than 75 has a low wear resistance and is not suitable for use as a tire tread. If the value of N$_2$SA exceeds 105, the resulting rubber composition exhibits an increased $\tan\delta$ value which leads to an excessive rolling resistance (RR). If the tinting strength (Tint) of the furnace carbon black is less than 90, the resulting rubber composition exhibits a poor wear resistance. If the Tint is greater than 110, the value of $\tan\delta$ is undesirably increased. If the dibutyl phthalate adsorption (24M4 DBP) value exceeds 110 (ml/100 g), a rubber composition having an excessive storage elastic modulus E' results. If $\Delta$ Tint is not more than $-3$, there is a tendency to decrease $\tan\delta$.

The value of $\Delta$ Tint is obtained by subtracting the calculated Tint from the measured Tint [i.e., $\Delta$ Tint = (measured Tint) − (calculated Tint)], and the calculated Tint is obtained from the following equation 1:

Calculated
Tint=56+1.057×(CTAB)−0.002745×(-
CTAB)$^2$−0.2596×(24M4
DBP)−0.201×(N$_2$SA−CTAB)   equation 1 see *Rubber Chemistry and Technology*, Vol. 48, page 538, 1975).

The furnace carbon black characterized above that is incorporated in the tire tread rubber composition of the present invention is used in an amount of 20 to 150 parts by weight, preferably 30 to 70 parts by weight, per 100 parts by weight of the rubber component. If the carbon black content is less than 20 parts by weight, the desired wear resistance is not obtained, and if the carbon black is used in an amount more than 150 parts by weight, an undesirably great energy loss occurs.

The furnace carbon black having the above properties can be prepared, for example, using a conventional oil-furnace type reaction furnace with suitably selecting thermal decomposition conditions of the raw material hydrocarbon, such as, a reaction temperature, an atmowhere in the reaction furnace, a residence time in the reaction furnace until cooling, and the like. In general, in order to increase the difference between the $N_2SA$ value and the IA value, the residence time should be shortened as compared with a conventional furnace carbon black. However, when the residence time is shortened, the difference between the $N_2SA$ value and the CTAB value is increased. Thus, the shortening of the residence time should be suitably selected so as to meet these two differences required in the present invention (i.e., $N_2SA - IA \geq 15$ and $N_2SA - CTAB \leq 5$).

When an oil is used in the preparation of the tire tread composition, the difference between the amount of the oil and that of the carbon black is preferably in the range of 30 to 40 parts [i.e., (carbon black amount)−(oil amount)=preferably 30 to 40 parts by weight]. If the difference is less than 30 parts by weight, the value of $E'$ increases thereby causing a drop in $\mu w$. If the difference is more than 40 parts by weight, the desired wear resistance of the tire tread is not obtained.

Needless to say, in addition to the carbon black characterized above, the rubber composition of the present invention may have incorporated therein any additive commonly used in rubber compounding such as a vulcanizing agent, a vulcanization accelerator, a vulcanization acceleration aid, an antioxidant, a softening agent or a filler.

As a result of incorporating the furnace carbon blacks described above in the present rubber composition, the same exhibits a small rolling resistance (RR), and tires which employ the composition at tire tread portion exhibit a high coefficient ($\mu w$) of sliding friction on a wet road surface.

The difference between the values of $N_2SA$ and IA should be at least 15 ($N_2SA - IA \geq 15$), and the greater the difference, the greater the surface activity of the carbon black. The difference between the values $N_2SA$ and CTAB should not be more than 5 ($N_2SA - CTAB \leq 5$), and the smaller the difference, the smaller the surface roughness of the carbon black. The great surface activity and the small surface roughness of the carbon black are both effective in changing the interaction between the carbon black and rubber in such a manner that the rubber blended with the carbon black has a reduced storage elastic modulus $E'$.

The advantages of the present invention are described below in greater detail by reference to the results of tests conducted with actual formulations of rubber compositions. The formulations of the respective compositions and the characteristics of the carbon blacks used, as well as the properties of the vulcanized rubber compositions and their tire performance data are shown in Table 1.

TABLE 1-1

| Components and Properties | Formulation No. Example | | | | |
|---|---|---|---|---|---|
| | 1 | 2 | 3 | 4 | 5 |
| Components (in parts by weight) | | | | | |
| SBR1500 | 100 | 100 | 100 | 100 | 100 |
| Zinc oxide | 3 | 3 | 3 | 3 | 3 |
| Sulfur | 1.75 | 1.75 | 1.75 | 1.75 | 1.75 |
| Stearic acid | 1 | 1 | 1 | 1 | 1 |
| Carbon black | 50 | 50 | 50 | 50 | 50 |
| TBBS | 1 | 1 | 1 | 1 | 1 |
| Properties of Carbon Black Used | | | | | |
| $N_2SA$ | 90 | 82 | 100 | 87 | 77 |
| IA | 70 | 65 | 83 | 63 | 55 |

TABLE 1-1-continued

| Components and Properties | Formulation No. Example | | | | |
|---|---|---|---|---|---|
| | 1 | 2 | 3 | 4 | 5 |
| CTAB | 87 | 79 | 98 | 86 | 77 |
| 24M4 DBP | 95 | 96 | 98 | 105 | 103 |
| Tint | 90 | 91 | 103 | 94 | 90 |
| Δ Tint | −12 | −6 | −4 | −5 | −4 |
| Physical Properties | | | | | |
| tan δ at 60° C. | 0.131 | 0.135 | 0.145 | 0.140 | 0.130 |
| E' (MPa) at 60° C. | 11.9 | 11.5 | 12.0 | 11.5 | 11.7 |
| Pico wear index | 94 | 93 | 112 | 95 | 90 |
| Tire Performance Index | | | | | |
| RR (index) | 81 | 82 | 87 | 84 | 79 |
| μw (index) | 114 | 117 | 114 | 119 | 116 |

TABLE 1-2

| Components and Properties | Formulation No. Comparative Example | | | | |
|---|---|---|---|---|---|
| | 6 | 7 | 8 | 9 | 10 |
| Components (in parts by weight) | | | | | |
| SBR1500 | 100 | 100 | 100 | 100 | 100 |
| Zinc oxide | 3 | 3 | 3 | 3 | 3 |
| Sulfur | 1.75 | 1.75 | 1.75 | 1.75 | 1.75 |
| Stearic acid | 1 | 1 | 1 | 1 | 1 |
| Carbon black | 50 | 50 | 50 | 50 | 50 |
| TBBS | 1 | 1 | 1 | 1 | 1 |
| Properties of Carbon Black Used | | | | | |
| $N_2SA$ | 70 | 110 | 90 | 90 | 100 |
| IA | 55 | 92 | 80 | 75 | 83 |
| CTAB | 69 | 106 | 88 | 82 | 99 |
| 24M4 DBP | 95 | 100 | 100 | 105 | 115 |
| Tint | 90 | 95 | 90 | 95 | 100 |
| Δ Tint | −1 | −15 | −11 | 0 | −4 |
| Physical Properties | | | | | |
| tan δ at 60° C. | 0.144 | 0.170 | 0.153 | 0.149 | 0.166 |
| E' (MPa) at 60° C. | 12.9 | 11.3 | 13.8 | 13.7 | 12.6 |
| Pico wear index | 72 | 108 | 94 | 96 | 110 |
| Tire Performance Index | | | | | |
| RR (index) | 88 | 107 | 89 | 89 | 105 |
| μw (index) | 104 | 119 | 95 | 92 | 107 |

TABLE 1-3

| Components and Properties | Formulation No. Comparative Example | | |
|---|---|---|---|
| | 11 | 12 | 13 |
| Components (in parts by weight) | | | |
| SBR1500 | 100 | 100 | 100 |
| Zinc oxide | 3 | 3 | 3 |
| Sulfur | 1.75 | 1.75 | 1.75 |
| Stearic acid | 1 | 1 | 1 |
| Carbon black | 50 | 50 | 50 |
| TBBS | 1 | 1 | 1 |
| Properties of Carbon Black Used | | | |
| $N_2SA$ | 90 | 82 | 93 |
| IA | 73 | 65 | 91 |
| CTAB | 88 | 80 | 91 |
| 24M4 DBP | 97 | 98 | 102 |
| Tint | 86 | 116 | 109 |
| Δ Tint | −16 | 19 | 6 |
| Physical Properties | | | |
| tan δ at 60° C. | 0.133 | 0.168 | 0.166 |
| E' (MPa) at | 11.6 | 13.0 | 13.4 |

TABLE 1-3-continued

| Components and Properties | Formulation No. Comparative Example | | |
|---|---|---|---|
| | 11 | 12 | 13 |
| 60° C. | | | |
| Pico wear index Tire Performance Index | 73 | 115 | 100 |
| RR (index) | 80 | 113 | 100 |
| $\mu w$ (index) | 115 | 103 | 100 |

Notes:

(1) The formulation components shown in the above table were in accordance with the "Formulations for Evaluation of Carbon Black Using SBR" specified in ASTM-D 3191 authorized by the American Society for Testing and Materials. SBR 1500: styrene-butadiene rubber, with bound styrene of 23.5%.

(2) The parameters tan $\delta$ and E' were measured with a viscoelastic spectrometer (product of Iwamoto Seisakusho, K.K.). The measured values were a strain of 0.6%, 100 Hz and 60° C. for the values indicated in Table 1, and 1.0% strain, 100 Hz and 60° C. for those indicated in Table 2.

(3) The pico wear index was determined in accordance with ASTM-D-2228, and is expressed in terms of relative values to Formulation No. 13 as standard, with the reciprocal of the wear of Formulation No. 13 being taken as 100. The smaller the index, the greater the pico wear.

(4) For the measurement of rolling resistance RR (energy loss) and coefficient ($\mu w$) of sliding friction on a wet road surface, tire samples (185/70 HR 14) were prepared using the tread formulations shown in Table 1. The respective values of RR and $\mu w$ were expressed as indices, with the values for Formulation No. 13 taken as 100. The smaller the value of RR, the better. On the other hand, the greater the value of $\mu w$, the better.

(5) TBBS: N-t-butyl-2-benzothiazole sulfenamide.

(6) The specific surface area of carbon black as measured by the nitrogen adsorption technique ($N_2SA$), iodine adsorption (IA), and the specific surface area as measured by the cetyltrimethylammonium bromide adsorption technique (CTAB) are indices for the surface area of carbon black particles in terms of the nitrogen, iodine or cetyltrimethylammonium bromide adsorbate on the particles. The value of the specific surface area ($N_2SA$) according to the nitrogen adsorption technique is indicated in $m^2/g$ and is determined by the method specified in ASTM D-3037-73; the value of iodine adsorption abbreviated as (IA) is indicated in mg/g and is determined by the method specified in ASTM-D 1765-739; and the value of the specific surface area as determined by the cetyltrimethylammonium bromide adsorption technique (CTAB) is indicated in $m^2/g$ and is determined by the method specified in ASTM-D 3765. The dibutyl phthalate adsorption (24M4 DBP) and tinting strength (Tint) values were measured in accordance with ASTM-D 3493-79 and ASTM-D 3265-75, respectively.

The results of the evaluation of various carbon black samples are shown in Table 1.

As is clear from Table 1, Formulation Nos. 1 to 5 exhibited superior characteristics. A carbon black with an $N_2SA$ value exceeding 105 provided a rubber composition having an increased tan $\delta$ value and hence an undesirably great RR value (Formulation No. 7). A carbon black having a 24M4 DBP value of more than 110 also provided a rubber composition having an undesirably great RR value (Formulation No. 10). Formulation Nos. 12 and 13 having a large $\Delta$ Tint, especially a $\Delta$ Tint value greater than $-3$, again produced rubber compositions having substantially large RR values. Formulation No. 12, having a Tint value exceeding 110, is particularly undesirable because of the excessively large RR value. Formulation No. 6, having an $N_2SA$ value of less than 75, produced a rubber composition having a relatively low RR value, but this rubber had an impracticably low level of wear resistance. Formulation No. 11 having a Tint value of less than 90 produced a rubber composition of low wear resistance.

Formulation Nos. 8 and 13, which exhibit a difference between $N_2SA$ and IA values of less than 15 ($N_2SA-IA \geqq 15$), and Formulation No. 9, which exhibits a difference between $N_2SA$ and CTAB values of greater than 5 ($N_2SA-CTAB \leqq 5$), all showed increased values of E', and their $\mu w$ values were correspondingly low.

Only Formulation Nos. 1 to 5 were satisfactory both in the wear resistance and the balance between rolling resistance (RR) and the coefficient ($\mu w$) of sliding friction on a wet road surface. These formulations had E' values of not more than 12.5 MPa, beyond which the value of $\mu w$ would decrease thereby resulting in insufficient gripping or braking action on a wet road surface.

As is apparent from the data shown above, in order to achieve the desired advantages of the tire tread rubber composition according to the present invention, the tire composition must contain a furnace carbon black having the following characteristics: (1) and $N_2SA$ value in the range of 75 to 105 ($m^2/g$) provided that the difference between $N_2SA$ and IA values is at least 15 ($N_2SA-IA \geqq 15$) and the difference between $N_2SA$ and CTAB is not greater than 5 ($N_2SA-CTAB \leqq 5$); (2) a 24M4 DBP value of not greater than 110 (ml/100 g); and (3) a Tint value in the range of 90 to 110, with $\Delta$ Tint being not greater than $-3$. Particularly good results are obtained by a rubber composition having a storage elastic modulus (E') of not greater than 12.5 MPa with the formulation specified in ASTM-D 3191 for the evaluation of carbon black. Such a rubber composition has a small energy loss, provides a substantial grip on wet road surfaces and exhibits a high wear resistance.

The carbon black used in the present invention and having the characteristics shown above is applicable not only to styrene-butadiene rubber (SBR), it is also applicable with equal results to natural rubber or any kind of synthetic rubber or blends thereof such as natural rubber (NR), or a blend of styrene-butadiene rubber (SBR) and natural rubber (NR), or a blend of SBR, NR and butadiene rubber (BR). See Table 2 below.

TABLE 2-1

| Components and Properties | Formulation No. | | | |
|---|---|---|---|---|
| | Example | | Comparative Example | |
| | 14 | 15 | 16 | 17 |
| Components (in parts by weight) | | | | |
| Natural rubber (NR) | 100 | 100 | 100 | 100 |
| Styrene-butadiene rubber | — | — | — | — |

TABLE 2-1-continued

| Components and Properties | Formulation No. | | | |
|---|---|---|---|---|
| | Example | | Comparative Example | |
| | 14 | 15 | 16 | 17 |
| Butadiene rubber (BR) | — | — | — | — |
| Carbon black | 50 | 50 | 50 | 50 |
| Aromatic oil | 15 | 15 | 15 | 15 |
| Zinc oxide | 3 | 3 | 3 | 3 |
| Stearic acid | 2 | 2 | 2 | 2 |
| Curing accelerator | 1.5 | 1.5 | 1.5 | 1.5 |
| Sulfur | 2 | 2 | 2 | 2 |
| Properties of Carbon Black Used | | | | |
| $N_2SA$ | 80 | 92 | 90 | 93 |
| IA | 60 | 70 | 72 | 91 |
| CTAB | 80 | 89 | 88 | 91 |
| $(N_2SA)-(IA)$ | 20 | 22 | 18 | 2 |
| $(N_2SA)-(CTAB)$ | 0 | 3 | 2 | 2 |
| 24M4 DBP | 102 | 95 | 98 | 102 |
| Tint | 92 | 98 | 80 | 109 |
| $\Delta$ Tint | −5 | −5 | −22 | 6 |
| Physical Properties | | | | |
| tan $\delta$ at 60° C. | 0.128 | 0.131 | 0.139 | 0.151 |
| E' (MPa) at 60° C. | 5.81 | 5.77 | 6.23 | 6.81 |
| Pico wear index | 102 | 103 | 75 | 100 |
| Tire Performance Index | | | | |
| RR (index) | 84 | 85 | 87 | 100 |
| μw (index) | 115 | 117 | 108 | 100 |

TABLE 2-2

| Components and Properties | Formulation No. | | | |
|---|---|---|---|---|
| | Example | Comparative Example | | |
| | 18 | 19 | 20 | 21 |
| Components (in parts by weight) | | | | |
| Natural rubber (NR) | 50 | 50 | 50 | 50 |
| Styrene-butadiene rubber (SBR) | 50 | 50 | 50 | 50 |
| Butadiene rubber (BR) | — | — | — | — |
| Carbon black | 60 | 60 | 60 | 60 |
| Aromatic oil | 20 | 20 | 20 | 20 |
| Zinc oxide | 3 | 3 | 3 | 3 |
| Stearic acid | 2 | 2 | 2 | 2 |
| Curing accelerator | 2 | 2 | 2 | 2 |
| Sulfur | 2.5 | 2.5 | 2.5 | 2.5 |
| Properties of Carbon Black Used | | | | |
| $N_2SA$ | 82 | 112 | 90 | 93 |
| IA | 65 | 90 | 85 | 91 |
| CTAB | 79 | 108 | 84 | 91 |
| $(N_2SA)-(IA)$ | 17 | 22 | 5 | 2 |
| $(N_2SA)-(CTAB)$ | 3 | 4 | 6 | 2 |
| 24M4 DBP | 96 | 105 | 95 | 102 |
| Tint | 91 | 106 | 102 | 109 |
| $\Delta$ Tint | −6 | −4 | 2 | 6 |
| Physical Properties | | | | |
| tan $\delta$ at 60° C. | 0.130 | 0.192 | 0.150 | 0.161 |
| E' (MPa) at 60° C. | 7.22 | 7.63 | 9.15 | 8.13 |
| Pico wear index | 97 | 110 | 88 | 100 |
| Tire Performance Index | | | | |
| RR (index) | 82 | 111 | 89 | 100 |
| μw (index) | 111 | 107 | 90 | 100 |

TABLE 2-3

| Components and Properties | Formulation No. | | | |
|---|---|---|---|---|
| | Example | | Comparative Example | |
| | 22 | 23 | 24 | 25 |
| Components (in parts by weight) | | | | |
| Natural rubber (NR) | 40 | 40 | 40 | 40 |
| Styrene-butadiene rubber (SBR) | 30 | 30 | 30 | 30 |
| Butadiene rubber (BR) | 30 | 30 | 30 | 30 |
| Carbon black | 55 | 55 | 55 | 55 |
| Aromatic oil | 20 | 20 | 20 | 20 |
| Zinc oxide | 3 | 3 | 3 | 3 |
| Stearic acid | 2 | 2 | 2 | 2 |
| Curing accelerator | 1.5 | 1.5 | 1.5 | 1.5 |
| Sulfur | 2 | 2 | 2 | 2 |
| Properties of Carbon Black Used | | | | |
| $N_2SA$ | 100 | 82 | 100 | 93 |
| IA | 82 | 64 | 82 | 91 |
| CTAB | 98 | 80 | 99 | 91 |
| $(N_2SA)-(IA)$ | 18 | 18 | 18 | 2 |
| $(N_2SA)-(CTAB)$ | 2 | 2 | 1 | 2 |
| 24M4 DBP | 98 | 100 | 120 | 102 |
| Tint | 100 | 92 | 97 | 109 |
| $\Delta$ Tint | −7 | −5 | −5 | 6 |
| Physical Properties | | | | |
| tan $\delta$ at 60° C. | 0.144 | 0.120 | 0.188 | 0.159 |
| E' (MPa) at 60° C. | 6.31 | 6.72 | 6.77 | 7.20 |
| Pico wear index | 113 | 98 | 110 | 100 |
| Tire performance Index | | | | |
| RR (index) | 88 | 80 | 115 | 100 |
| μw (index) | 116 | 109 | 107 | 100 |

Notes

Samples marked "Example" in Table 2 were prepared according to the present invention using carbon blacks having the characteristics defined above. Samples marked "Comparative Example" refer to comparative samples which used carbon blacks outside the scope of the present invention.

The pico wear, RR and μw index values are each expressed in terms of relative values to Formulation No. 17 as standard in Table 2-1, Formulation No. 21 as standard in Table 2-2 and Formulation No. 25 as standard in Table 2-3, said standard values being taken as 100.

Figure 2:
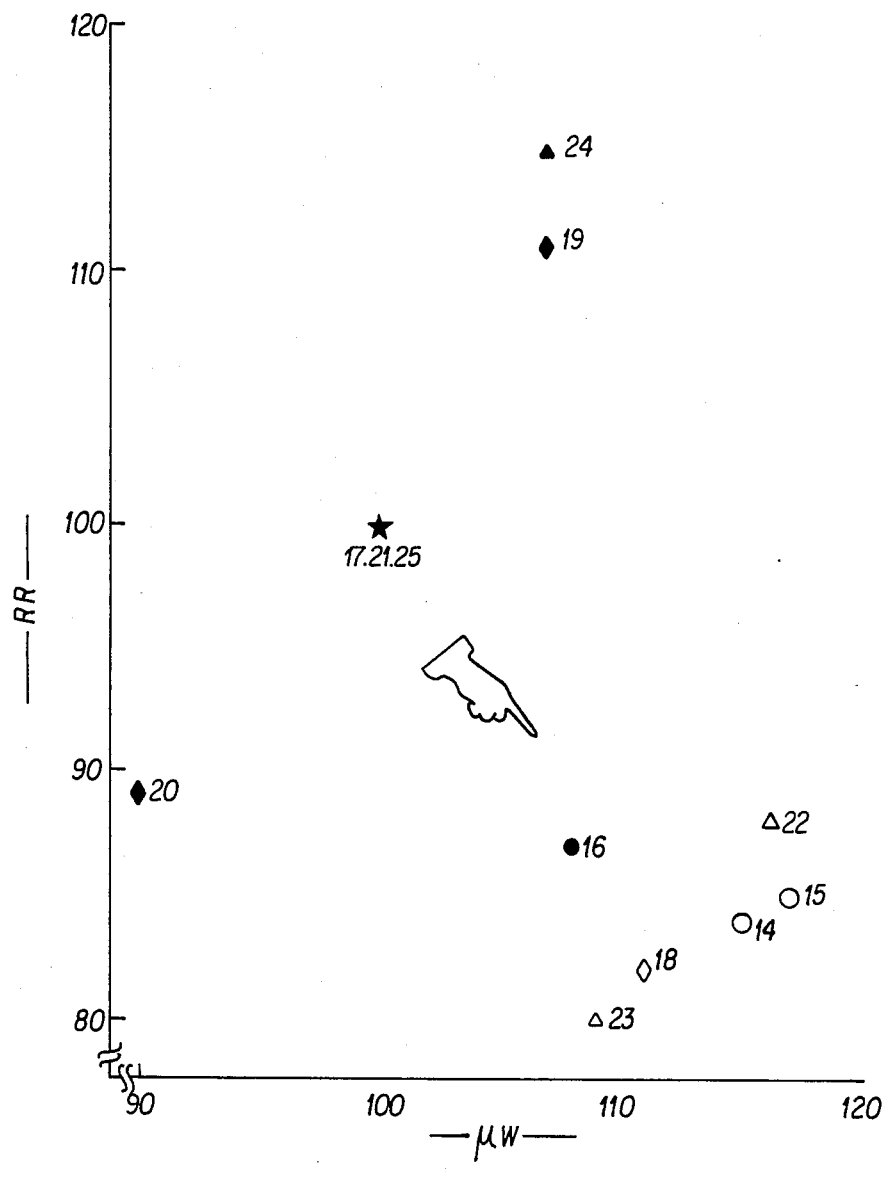

The values of the tire rolling resistance (RR) and the coefficient (μw) of sliding friction on a wet road surface shown in the test results of Tables 1 and 2 are correlated in the graphs of FIGS. 1 and 2. Each graph plots μw and RR values on the x-axis and y-axis, respectively. The open dots (o) in FIG. 1 refer to the formulations that satisfy the requirements recited in the claims of the present invention, whereas the solid trianges (▲) and diamonds (◆) refer to the formulations outside the scope of the present invention, and those indicated by the solid diamonds (◆) had a low wear resistance.

The values moving further in the direction indicated by the closed fist represent generally preferred results except for those samples having insufficient wear resistance. Formulation No. 11 (FIG. 1) and Formulation No. 16 (FIG. 2) provided rubber compositions having relatively good balance between the values of RR and μw but poor wear resistance moved further in the direction indicated by the closed fist.

In FIG. 2, the open dots (o), diamond (◊) and triangles (△) refer to the formulations that satisfy the ranges defined in the claims. The formulations identified by the solid and open dots (● and o) contained natural rubber, while the formulations identified by the solid and open diamonds (◆ and ◊) contained an NR/SBR blend. The formulations identified by the solid and open triangles (▲ and △) contained a blend of three elastomers, i.e., NR, SBR and BR. The solid marks all refer to formulations outside the scope of the present invention. The solid star represents Formulation Nos. 17, 21 and 25. These formulations were used as reference indices for comparing the characteristics of the other formulations.

As shown in FIGS. 1 and 2, the tire tread rubber composition of the present invention is advantageous in that it has a small rolling resistance (reduced energy loss) and exhibits a substantial coefficient of sliding friction on wet road surfaces.

Having now fully described the invention, it will be apparent to one of ordinary skill in the art that many changes and modifications can be made thereto without departing from the spirit or scope of the invention as set forth herein.

What is claimed is:

1. A rubber composition, comprising: from 20 to 150 parts by weight of carbon black incorporated in 100 parts by weight of diene rubber, said carbon black being a furnace carbon black having (1) a specific surface area ($N_2SA$) within the range of 75 to 105 (M 2/9) as measured by the nitrogen adsorption technique, (2) the difference between said $N_2SA$ value and the measured iodine adsorption (IA) being at least 15, as represented by the formula $N_2SA - IA \geq 15$, and (3) the difference between said $N_2SA$ value and the measured surface by the cetytrimethylammonium bromide technique (CTAB) being not greater than 5, as represented by the formula $N_2SA - CTAB \leq 5$, said furnace carbon black further having a dibutyl phthalate adsorption value (24M4 DBP) of not greater than 110 (ml/100 g), a $\Delta$ Tint value of not more than $-3$ which is obtained by subtracting the calculated tint value from the measured tint value, as represented by the formula: (Measured Tint)—(Calculated Tint)=$\Delta$Tint$\leq -3$ and a tinting strength (Tint) of 90 to 110, said carbon black having a storage elastic modulus E' of not greater than 12.5 MPa as specified by the recipe of the ASTM-D 3191 method for carbon blacks.

2. The composition of claim 1, wherein said rubber is a natural rubber or a synthetic rubber of blends thereof.

3. The composition of claim 1, wherein from 30 to 70 parts by weight of said carbon black is combined with 100 parts by weight of the rubber component.

4. The composition of claim 1, wherein said rubber composition further comprises a vulcanizing agent, a vulcanization accelerator, a vulcanization acceleration aid, an antioxidant, a softening agent, a filler or combinations thereof.

5. The composition of claim 1, which further comprises an oil in an amount which is at least 30 parts by weight less than the amount of said carbon black, but not more than 40 parts by weight less than the amount of said carbon black.

6. The composition of claim 2, wherein said synthetic rubber is styrene-butadiene rubber or butadiene rubber.

* * * * *